(12) United States Patent
Gauthey et al.

(10) Patent No.: US 7,286,063 B2
(45) Date of Patent: Oct. 23, 2007

(54) METHOD OF INPUT OF A SECURITY CODE BY MEANS OF A TOUCH SCREEN FOR ACCESS TO A FUNCTION, AN APPARATUS OR A GIVEN LOCATION, AND DEVICE FOR IMPLEMENTING THE SAME

(75) Inventors: Darryl Gauthey, Yverdon (CH); Pierre-Andre Farine, Neuchâtel (CH)

(73) Assignee: Asulab S.A., Marin (CH)

( * ) Notice: Subject to any disclaimer, the term of this patent is extended or adjusted under 35 U.S.C. 154(b) by 513 days.

(21) Appl. No.: 10/721,341

(22) Filed: Nov. 26, 2003

(65) Prior Publication Data

US 2004/0113819 A1 Jun. 17, 2004

(30) Foreign Application Priority Data

Nov. 26, 2002 (CH) ..................................... 1990/02

(51) Int. Cl.
*H03K 17/94* (2006.01)
*H03M 11/00* (2006.01)

(52) U.S. Cl. .......................... 341/34; 345/156; 345/173; 340/5.61; 708/111

(58) Field of Classification Search .................. 341/34; 368/10; 340/5.2, 5.51, 5.54, 5.61, 5.64, 5.7, 340/5.71; 345/173; 178/18.01; 708/111
See application file for complete search history.

(56) References Cited

U.S. PATENT DOCUMENTS 4,139,837 A 2/1979 Liljenwall et al.

(Continued)

FOREIGN PATENT DOCUMENTS

EP 0838737 A1 4/1998

(Continued)

OTHER PUBLICATIONS

E. Miltgen, European Search Report, Application No. EP 02 07 9952, 4 pages, completed The Hauge, May 9, 2003.

(Continued)

*Primary Examiner*—Timothy Edwards, Jr.
(74) *Attorney, Agent, or Firm*—Griffin & Szipl, P.C.

(57) ABSTRACT

The method relates to the input of a security code by means of a touch screen of an electronic device such as a watch for access to a specific function, an apparatus or a given location. This touch screen comprises control keys, which can be activated by a manual action of a user using a finger or a stylus. Each key is linked to a microprocessor unit of the electronic device. The method comprises steps which consist of placing a finger or stylus on a key of the touch screen, which represents a first reference of the code to be entered, moving the finger or stylus from the first reference to a key of a second reference over a specific trajectory through the microprocessor unit, keeping the finger on the second reference for a given period of time or detecting a change in trajectory of the finger in the area of the key of the second reference to be input, moving the finger from the key of the second reference to a key of a third reference over a specific trajectory, and removing the finger or stylus from the touch screen to validate the entered code and access to the function, apparatus or given location.

16 Claims, 5 Drawing Sheets

U.S. PATENT DOCUMENTS

| | | | |
|---|---|---|---|
| 4,644,352 A * | 2/1987 | Fujii | 340/7.21 |
| 4,786,900 A * | 11/1988 | Karasawa et al. | 340/5.32 |
| 6,193,152 B1 | 2/2001 | Fernando et al. | |
| 6,282,152 B1 * | 8/2001 | Kurple | 340/5.32 |
| 6,359,838 B1 * | 3/2002 | Taylor | 368/13 |
| 6,720,860 B1 * | 4/2004 | Narayanaswami | 340/5.54 |
| 2002/0109580 A1 * | 8/2002 | Shreve et al. | 340/5.61 |
| 2002/0109677 A1 * | 8/2002 | Taylor | 345/173 |
| 2005/0151623 A1 * | 7/2005 | von Hoffmann | 340/5.61 |

FOREIGN PATENT DOCUMENTS

| | | |
|---|---|---|
| EP | 0910050 A1 | 4/1999 |
| EP | 1065791 A2 | 1/2001 |
| EP | 1207439 A1 | 5/2002 |
| FR | 2798208 A | 3/2001 |
| GB | 2129176 A | 5/1984 |
| WO | WO 01/91061 A2 | 11/2001 |

OTHER PUBLICATIONS

"Montre altimetre-boussole presentant un nouveau concept d'utilisation," Sep. 30, 1999, 64th Congress of the Swiss Chronometry Society.

* cited by examiner

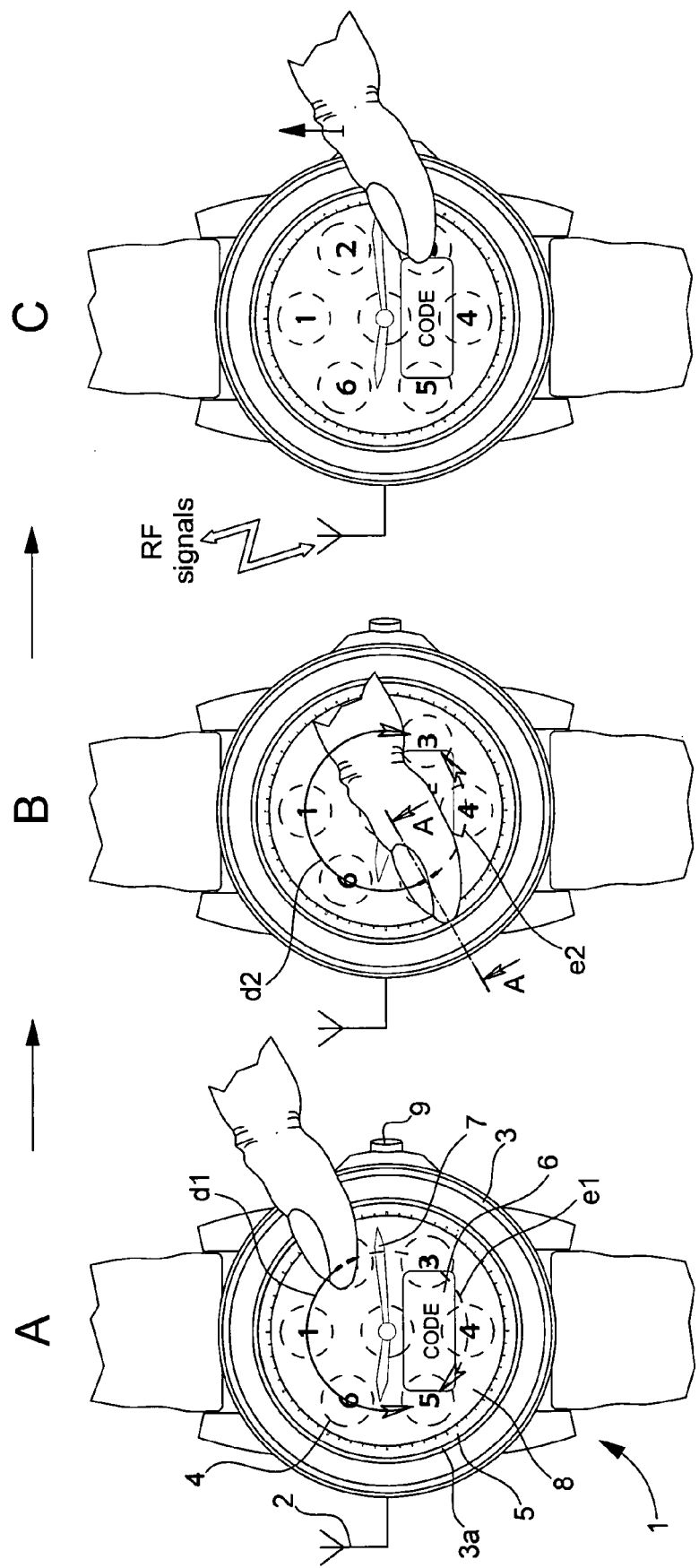

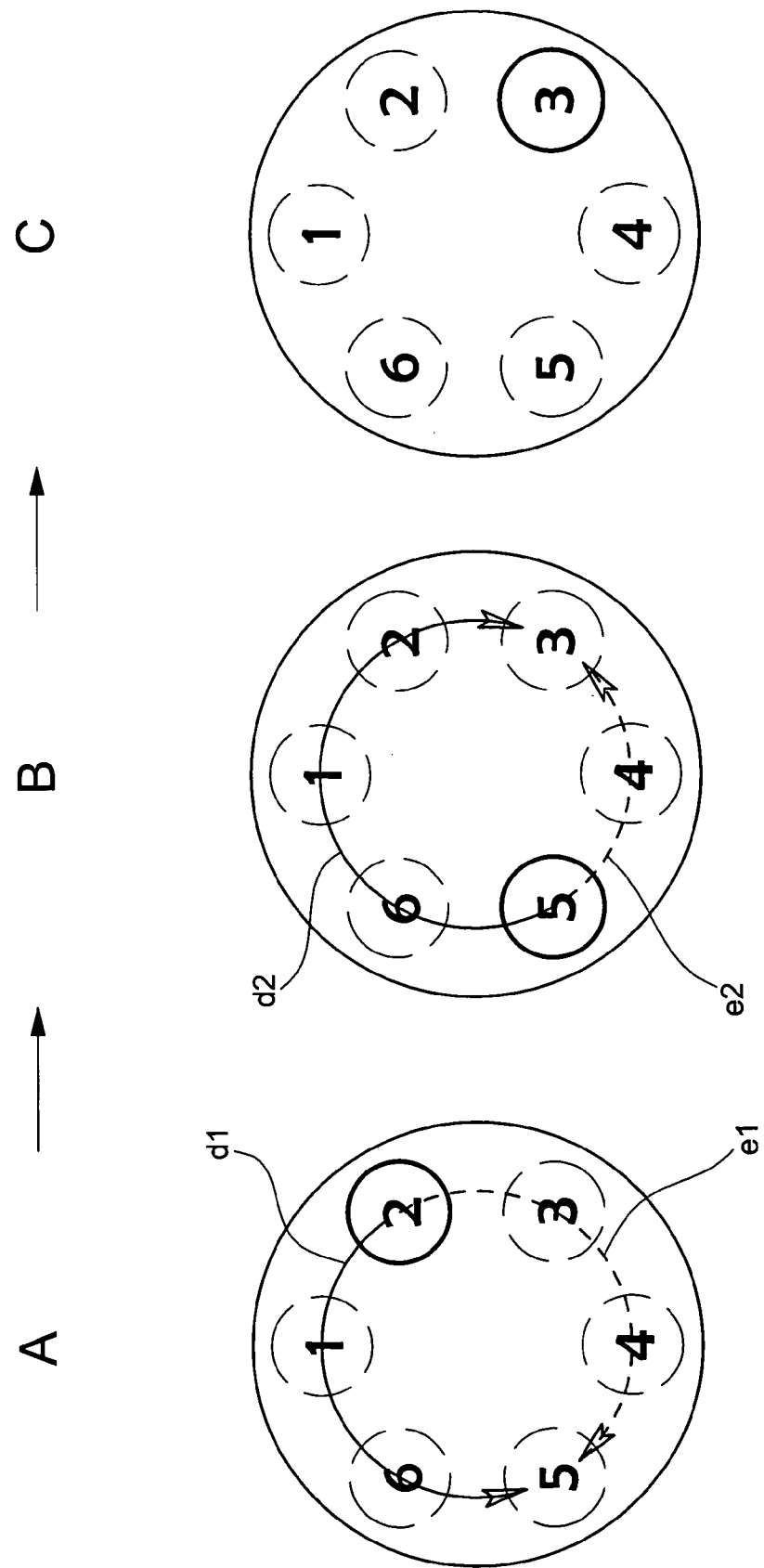

METHOD OF INPUT OF A SECURITY CODE BY MEANS OF A TOUCH SCREEN FOR ACCESS TO A FUNCTION, AN APPARATUS OR A GIVEN LOCATION, AND DEVICE FOR IMPLEMENTING THE SAME

This application claims priority of Swiss Application No. 1990/02, filed Nov. 26, 2002, the entire disclosure of which is incorporated herein by reference.

FIELD OF THE INVENTION

The invention relates to a method of input of a security code by means of a touch screen of an electronic device for access to a function, an apparatus or a given location. The touch screen of the device comprises control keys which can be activated by a manual action of a user via a finger or a stylus. Each key is made up of at least one sensitive pad linked to a microprocessor unit of the electronic device. The method of input of the security code can be implemented, for example, by means of a portable object such as a wrist watch.

The invention also relates to an electronic device for implementing the method.

BACKGROUND OF THE INVENTION

In some applications it is necessary to compose a security code to give access for an authorised person to an apparatus such as a personal computer workstation, or a protected location such as a strong room, or a specific location of a building or the person's own home. For this, it has already been proposed in the document GB 2 129 176 to provide a user with a wrist watch, in which a security code has been stored in a non-volatile memory. The back-cover of the watch case contains electric contacts for contact with the wrist of a user. The watch also contains means for transmitting the security code. When a finger of the wearer of the personal watch comes into contact with a conductive surface of a receiver of a location to be accessed, the security code is automatically transmitted numerically via resistor. The signals of the security code are therefore transmitted through the hand of the wearer of the watch from a processing unit of the watch to the receiver. This security code is therefore dependent on the physical parameters of the wearer of the watch and this can enable identification of the authorised person to enter the protected location.

A disadvantage of such an access procedure is that the transmission of this security code is also dependent on the capacitor value defined between the wrist of the user of the watch and earth. As a result, the type of shoes worn by the user of the watch can have a considerable influence on recognition of the security code transmitted to the receiver of the location to be accessed.

Other solutions are conceivable for input of the security code. In more complicated devices, a check can be conducted via voice recognition, a fingerprint or the internal structure of the eye to provide a security code for access to an apparatus or a given location.

More simply, the security code can be entered on a watch and transmitted in particular by means for transmitting radio-frequency, optical or acoustic signals. This security code can be input by different buttons or keys of the watch. According to the present invention, the security code is input, for example, by a user by means of a finger or a stylus on a touch screen of an electronic device.

In the field of character recognition, it is known to use a touch screen fitted with several touch-sensitive pads. The document U.S. Pat. No. 4,139,837, which describes a wrist watch with such a touch screen, may be cited in this regard. In this document, the sensitive pads of the touch screen are linked to a logic circuit and to a processing unit for the recognition of characters such as digits or arithmetic operators indicated by the finger of a user. The processing unit recognises the digit or operator indicated by the finger of the user taking into account the start sensitive pad, the last sensitive pad of the finger and sensitive pads touched during movement of the finger. Thus, with the aid of this touch screen it is possible to achieve recognition of a character by movement of the finger on the sensitive pads of the glass. This watch can be used as a calculator, for example. However, there is no provision in this watch for entering a security code to allow access to a particular function of the watch, an apparatus or location remote from the wearer of the watch.

Therefore, the subject of the invention is a method of input of a security code by means of a touch screen of an electronic device for access to a function, apparatus or location, which overcomes the disadvantages of the prior art and which allows said security code to be entered quickly and easily.

SUMMARY OF THE INVENTION

For this purpose, the subject of the invention relates to a method of input of a security code which has certain desirable features. Specifically, in a first embodiment in accordance with the present invention, a method of input of a security code by means of a touch screen of an electronic device is provided for access to a function, an apparatus or a given location, wherein the touch screen comprises control keys, which can be activated by manual action of a user using a finger or a stylus, each of the keys comprises at least one sensitive pad linked to a microprocessor unit of the electronic device, wherein the method comprises a first series of steps in an entry mode of the security code, the first series of steps comprising: (a) placing a finger or stylus on a first key of the touch screen, wherein the first key represents a first reference of the code to be entered: and (b) moving the finger or stylus on the touch screen over a specific trajectory from the first key to a second key of the touch screen, wherein the second key represents a second reference of the code to be entered, and wherein the microprocessor unit registers sensitive keys or pads activated during the movement of the finger or stylus on the screen to determine the security code.

An advantage of the method of input of the security code according to the invention is that it is easy and quick using a finger or a stylus to input such a code on a touch screen of an electronic device without requiring the use of a push-button keyset. This electronic device can form part of an appliance or a portable object, or be disposed at the entrance of a given location.

A wrist watch can advantageously be used to implement the method of input of the security code, since it constitutes a portable object which is worn by many people on a daily basis, in particular for indicating the time and date. Control keys for entry of the security code are defined by means of sensitive pads disposed on the inside or outside face of the watch glass. Arranging a given number of sensitive pads around the periphery of the glass makes it easy for a finger of the user to enter the security code. The number of sensitive keys or pads around the periphery of the glass can equal 6, for example, by adequately spacing these from one another.

By means of the upper edge of the bezel of the case or the section of the rim surrounding the watch glass, the finger can easily pass from one key of the first reference to the key of the second reference of the code to be entered. Depending on whether the finger has moved from the first reference to the second reference in a clockwise or anti-clockwise direction, two security codes can be entered and recognised by the microprocessor unit. However, the microprocessor unit would be able to take into account multiple movements of the finger over various sensitive pads of the watch glass between the key of the first reference and the key of the second reference of the code. Therefore, several security codes can be entered with only two references, which are digits, for example, so long as the user remembers the manner of movement of his/her finger on the glass.

If more than two references have to be entered for the security code, it can be programmed that the finger follows the upper edge of the bezel between each reference in an anti-clockwise or clockwise direction. This edge of the bezel is preferably circular, but may also be rectangular or of another shape. Thus, the entry of the security code on the watch glass can be equated with the entry of a security code of a dial lock of a safe. Upon movement of the finger or stylus on the touch screen between the first reference and the last reference of the code, the microprocessor unit can detect a change in trajectory of the movement of the finger or stylus on the screen in the area of the key of each reference to be input. It can also be provided that the microprocessor unit detects a specific period of time for keeping the finger or stylus on the key of the reference to be input.

According to a particular embodiment of a portable object such as a wrist watch or a mobile telephone for implementing the method according to the invention, the touch screen can comprise control keys arranged in the form of a matrix. Each control key is defined by one or more sensitive pads in accordance with a configuration determined by the microprocessor unit. The number of sensitive pads in this configuration can be greater than 25.

For this purpose, the invention also relates to an electronic device for implementing the method provided in the first embodiment of the present invention. In other words, a second embodiment in accordance with the present invention is an electronic device that implements the method of the first embodiment. Specifically, the second embodiment in accordance with the present invention is an electronic device comprising: a touch screen with control keys, wherein the touch screen is activated by a manual action of a user using a finger or a stylus, and each of the keys comprises at least one sensitive pad connected to a microprocessor unit, wherein the microprocessor unit is fitted to register sensitive keys or fields activated during movement of the finger or stylus on the screen from one key representing a first reference to second key representing a second reference determining a security code, wherein the electronic device operates to implement a method of input of a security code by means of the touch screen for access to a function, a first device or a given location, wherein the method comprise a series of steps in an entry mode, the series of comprising: (a) placing a finger or stylus on a first key of the touch screen, wherein the first key represents a first reference of the code to be entered; and (b) moving the finger or stylus on the touch screen over a specific trajectory from the first key to a second key of the touch screen, wherein the second key represents a second reference of the code to be entered, and wherein the microprocessor unit registers the sensitive keys or pads activated during the movement of the finger or stylus on the screen to determine the security code.

BRIEF DESCRIPTION OF THE DRAWINGS

The aims, advantages and features of the method of input of the security code using a touch screen of an electronic device will be illustrated more clearly in the following description with reference to the attached drawings:

FIG. 1a shows the different input steps of the security code of the method according to the invention using a touch screen of an electronic device such as a wrist watch according to a first embodiment;

FIG. 1b shows a more schematic view of the different input steps of the security code of the method according to the invention of FIG. 1a;

FIG. 2 shows a partial section along A-A of the wrist watch of FIG. 1a;

DETAILED DESCRIPTION OF ILLUSTRATIVE EMBODIMENTS

Figure 2:
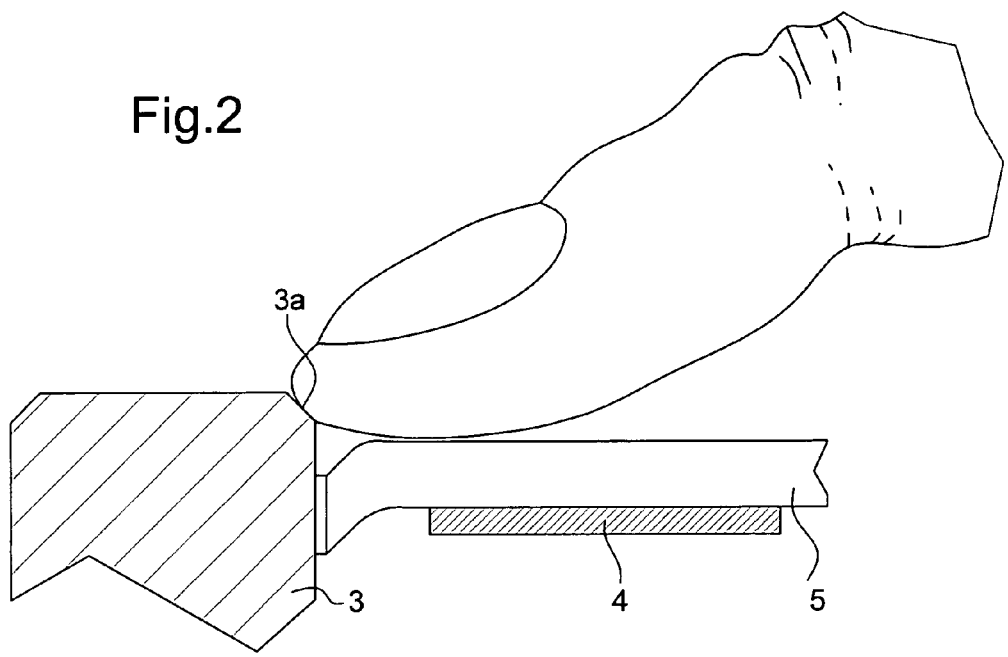

In the following descriptions none of the electronic components in accordance with the second embodiment of the present invention, which are serving to implement the method of input of the security code in accordance with a first embodiment of the present invention, will be explained in detail. Those persons skilled in the art in this technical field would be reasonably familiar with these well known electronic components. According to the method of the invention, which is believed to evince patentable features, the security code is entered by means of control keys of a touch screen of an electronic device by a finger of the user. This code is generally defined by (a) at least one first reference of a sensitive pad or an activated key of the screen, (b) a second reference of the same key or another activated key, and (c) the path followed by the finger on the touch screen from the first reference to the second reference. The detected path of the finger on the screen can be made by verification of the activated pad or pads of the first reference to the second reference.

For implementing the method of input of the security code with respect to FIG. 1a, the electronic device is preferably a wrist watch according to a first embodiment. The wrist watch 1 is of analog type with a dial 8, hands 7 for indicating the time, a watch movement disposed under the dial 8 in a case 3 closed by a glass 5, a liquid-crystal display 6 for displaying data or operations to be performed, control keys 4 on the inside face of the glass and a control button 9 on the case. The glass 5 is held by a bezel 3a or by the upper section of the rim of the case 3. A battery or accumulator (not shown) in the case 3 allows electric power to be fed to the electronic components of the watch. The control keys 4 are preferably capacitance-type sensors which can each be activated by a finger of a user or a stylus (not shown) placed in a specific zone of the sensor to be activated. At least one, preferably transparent, sensitive pad, constitutes each sensor or control key.

It is clearly evident that a watch for indicating the time numerically having, for example, control buttons on the case for activation of various functions of the watch is also conceivable. Moreover, at least one crown can be provided in particular to adjust the time and date.

The glass 5 bearing the touch-sensitive keys 4 or pads on its inside face constitutes the touch screen of the electronic device, which in this case is a wrist watch. In this embodiment of FIG. 1a, the watch glass comprises 6 adequately spaced sensitive keys or pads 4, which are disposed around the periphery of the glass. A sensitive key or pad can be positioned at the centre of the glass for selection of different menus of functions of the watch. In the input menu for the security code, each key represents a digit or number of the code to be entered. To facilitate input of the code, reference marks designating the digits or numbers can be positioned under the glass to indicate the position of the transparent sensitive keys or pads.

As shown in FIG. 2, the upper section of the bezel 3a of the case 3 of the watch has an edge, which can be bevelled. The finger can rest on this edge of the bezel during movements on the keys of the periphery of the glass to enter the security code. The outside face of the glass is therefore preferably located below the upper edge of the bezel 3a to facilitate guidance of the finger on the glass.

Figure 3:
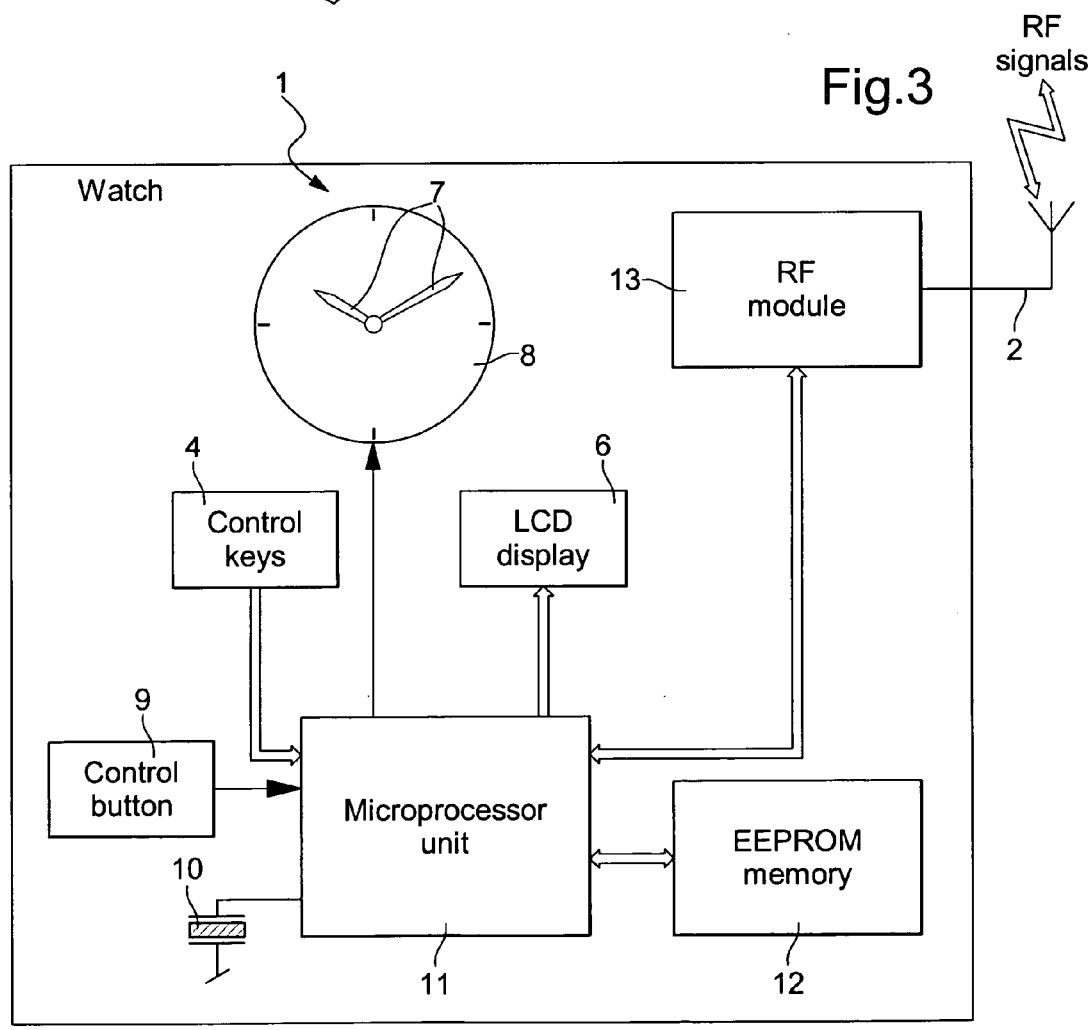
FIG. 3 schematically shows different electronic units of the wrist watch of FIG. 1a for implementing the method of input of the security code according to the invention.

For implementation of the method according to the invention, the wrist watch 1 comprises different electronic components shown schematically in FIG. 3. The watch 1 in particular comprises a microprocessor unit 11 programmed to execute certain personalised functions, e.g. for a diary function or for a function for entering the security code. This microprocessor unit 11 also comprises some modules related to the time base for the command for display of the time by the hands 7 on the dial 8 of the watch. An oscillator stage connected to a quartz resonator 10 is disposed in the microprocessor unit 11 to sequence various operations of the watch. The oscillation frequency can be in the order of 32'768 Hz.

The microprocessor of the unit 11 can, for example, be the 8-bit PUNCH microprocessor manufactured by EM Microelectronic-Marin SA in Switzerland.

Once the control button 9 has been pressed, for example, the control keys 4 of the touch screen can be activated to supply signals to the microprocessor unit 11. In an entry mode of the security code, these signals from keys 4 relate to the digits or numbers of the code to be entered and to the path followed by the finger on the glass for entry of the code. The microprocessor unit linked to sensitive pads allows translation of the actions of the finger on the watch glass for entry of the security code. In another selected mode, the keys 4 can also serve to select different menus, for example, a diary function. In this diary function, the data to be stored in the non-volatile EEPROM 12 memory can be edited. The consulted or edited data can appear on at least one liquid-crystal display 6.

The microprocessor unit 11 can be connected to a RF module 13 and an antenna 2 of means for transmitting and/or receiving radio-frequency signals for transmission of the security code to an apparatus such as a computer workstation or to a security portal structure. Radio-frequency signals relating to a request for the security code can also be received by the transmitting and/or receiving means. In this case, the control keys of the watch glass can be actuated as soon as the security code request signals are received. These transmitting and/or receiving means will not be explained in detail, as they are part of the basic knowledge of a person skilled in the art in this technical field.

For supplementary technical details on the layout of the sensitive pads and electronic components of the watch, the reader is referred to document EP 0 838 737 of the same applicant and to points 2 and 5 of the publication dated 30 Sep. 1999 on the occasion of the 64th congress of the Swiss Chronometry Society entitled "Montre altimétre-boussole présentant un nouveau concept d'utilisation"[altimeter-compass watch with a new concept of use] of Asulab SA, which are cited in the reference.

In FIGS. 1a and 1b, the security code is composed of three digits, e.g. 2, 5 and 3. Clearly it can be provided that the code is defined with only two digits or more than three digits. This depends on the previous programming conducted by the user, in particular in the microprocessor unit and stored in the non-volatile memory.

As shown in diagram A in FIG. 1a, the finger must firstly be placed on the sensitive key or pad of a first reference of the security code to be entered, e.g. the digit 2. The microprocessor unit can directly recognise the first reference of the code to be entered as soon as the finger is placed on the sensitive key or pad of the first reference. However, it can also be provided that the finger is kept on the key of this first reference for a specific period of time to confirm input of this first reference in the code to be entered. The specific period of time for recognition of the reference to be input can be previously programmed using the microprocessor unit. This period of time is defined, for example, between 0.5 and 2 sec.

From this first reference, the finger can be moved on the glass over an anti-clockwise trajectory d1 or over a clockwise trajectory e1 to reach the sensitive pad or the key of the second reference of the code to be entered. This second reference is defined as the digit 5. The microprocessor unit of the watch determines the trajectory of movement (here clockwise or anti-clockwise) of the finger on the watch glass by the sensitive keys or pads activated in succession. On the first trajectory d1, the keys representing the digits 1 and 6 are activated upon movement of the finger towards the key of the digit 5. On the second trajectory e1, the keys 3 and 4 are activated upon movement of the finger towards the key of the digit 5. Hence, over the anti-clockwise first trajectory d1, a first code can be entered with the digits 2 and 5, and over the clockwise second trajectory e1, a second code can be entered with the digits 2 and 5. As a result, according to the invention it is necessary to know the trajectory of movement of the finger in addition to the sequence of the digits of the security code.

If the security code was only defined by two references in addition to the direction of rotation of the finger on the glass, the digit 5 would constitute the last digit of the code to be entered. This digit can be input by removing the finger from the sensitive key or pad of this digit 5, which also results in validation of the code entered. However, it can also be provided that the input of this digit 5 in the security code is achieved by keeping the finger on the key of the digit 5 for a specific period of time as shown in diagram B of FIG. 1a.

With only two digits and the direction of movement of the finger in the clockwise or anti-clockwise direction, it is possible to enter 72 security codes with the 6 keys of the watch glass without making more than one turn of the finger to input the two digits of the code. The two digits can be identical or different, e.g. "1 1" or "1 2".

Naturally, a greater number of security codes with two digits can be entered if the microprocessor unit also registers the number of turns of the finger in clockwise or anti-clockwise direction from the first digit to the second digit of the code to be entered.

From this second reference representing the digit 5 the finger can be moved on the glass over a clockwise trajectory d2 or over an anti-clockwise trajectory e2 to reach the sensitive key or pad of the third reference of the code to be entered. This third reference is defined as the digit 3. As above, the microprocessor unit determines the trajectory of movement of the finger (here clockwise or anti-clockwise) on the glass by the keys activated in succession. On the third clockwise trajectory d2, the keys representing the digits 6, 1 and 2 are activated upon movement of the finger towards the key of the digit 3. On the anti-clockwise fourth trajectory e2, the key representing the digit 4 is activated upon movement of the finger towards the key of the digit 3. To input the digit 3 in the security code, the finger must remain on the sensitive pad or key of the digit 3 for a specific period of time as shown in diagram C in FIG. 1a. To validate the security code entered, the finger is removed from the sensitive pad of the digit 3. From this instant, the microprocessor unit registers the end of the security code entry. Thus, four different security codes can be entered with the digits 2, 5 and 3 in the sequence indicated over the trajectories of movement of the finger on the watch glass.

With three digits and the trajectories of movement of the finger in the anti-clockwise or clockwise direction, it is possible to compose 864 different security codes with the 6 keys around the periphery of the glass without making more than one turn with the finger from one digit to another to be input in the code. In this case, the microprocessor unit can merely detect a sensitive key or pad activated between each reference to determine the trajectory of movement of the finger.

As described above, a higher number of security codes with three digits can be entered if the microprocessor also registers the number of turns of the finger in the clockwise or anti-clockwise direction between the different digits of the code to be entered.

In a quicker approach, the input of the second reference in the security code which includes at least three references can be achieved by detecting a change in trajectory of the finger in the area of the sensitive key or pad of the second reference of the code to be entered. According to the embodiment illustrated in FIGS. 1a and 1b, the microprocessor unit detects the change from a clockwise trajectory to an anti-clockwise trajectory, or vice versa. As a result of this, the security code can be entered more quickly, since it is thus not necessary to provide a waiting time on the key of this second reference for input in the security code. However, a smaller number of security codes can be entered. From the key of the first reference, the finger can be moved over the anti-clockwise trajectory d1 to the key of the second reference and then directly over the clockwise trajectory d2 to the key of the third reference. The finger can also be moved over the clockwise trajectory e1 from the key of the first reference to the key of the second reference and then directly over the anti-clockwise trajectory e2 to the key of the third reference. From this key of the third reference, the finger can be removed directly from the glass to validate the security code with these three references and the trajectories of movement of the finger.

By detecting a change in trajectory, the security code to be entered with the keys of the watch glass equates with the entry of a security code by means of a dial lock of a safe.

Naturally, the number of security codes which can be entered on the watch glass can be higher. For this, the microprocessor unit must be capable of detecting the sequence of each key activated on the glass from the first reference to the second reference, or from the second reference to the third reference. However, the user must be able to remember the path his/her finger must follow between each reference of the code to be entered. The quickest and surest approach is for the finger to follow the upper edge of the bezel in the anti-clockwise direction or in the clockwise direction between each reference of the code to be entered.

All the steps of entering the security code described above are shown more clearly in FIG. 1b. In diagram A the finger or stylus is shown by the key in bold print representing the digit 2 to be activated. From the key of this digit 2, the finger can be moved on the glass over the anti-clockwise trajectory d1 or the clockwise trajectory e1 to reach the key of the digit 5. In diagram B the finger or stylus is shown by the key in bold print representing the digit 5 to be input in the security code. The finger or stylus can be held on the key of the digit 5 for a specific period of time for input in the code. This digit 5 can also be input by changing the trajectory of the finger or stylus in the area of the key of the digit 5. From this key of the digit 5, the finger or stylus can be moved on the glass over the clockwise trajectory d2 or the anti-clockwise trajectory e2 to reach the key of the digit 3. In diagram C the finger or stylus is shown by the key in bold print representing the digit 3 to be input. The digit 3 can be input in the security code by holding the finger or stylus on the key of the digit 3 for a specific period of time or simply by removing the finger or stylus from the screen.

During the steps for entry of the code, the references of the code and the path followed by the finger can be memorised momentarily by the microprocessor unit before verification of said authorised code. Once entry of the code has ended, an operation of verifying the security code input can thus be performed in the microprocessor unit. If the security code entered on the watch glass corresponds to a previously memorised code, the user can access a specific function of the watch such as a diary function. However, this security code can also be transmitted by short-range radio-frequency signals to authorise access to an electronic apparatus such as a computer workstation or a security door or portal structure.

It should be noted that verification of the security code can be performed immediately during the various steps of entry of said code by the microprocessor unit or by an electronic apparatus receiving the signals of the security code from the watch.

In the preliminary steps of the method of input of the security code, the user can determine the digits and the trajectories of movement of the finger which he/she wishes to memorise, in particular in the non-volatile memory of the watch. In order to do this, he/she must also execute the operations indicated above when in the mode of modifying or recording the security code.

In the entry mode of the security code or in the mode of modifying or recording said code, the hands of the analog watch can be moved to indicate each digit composed of the security code.

Figure 4A:
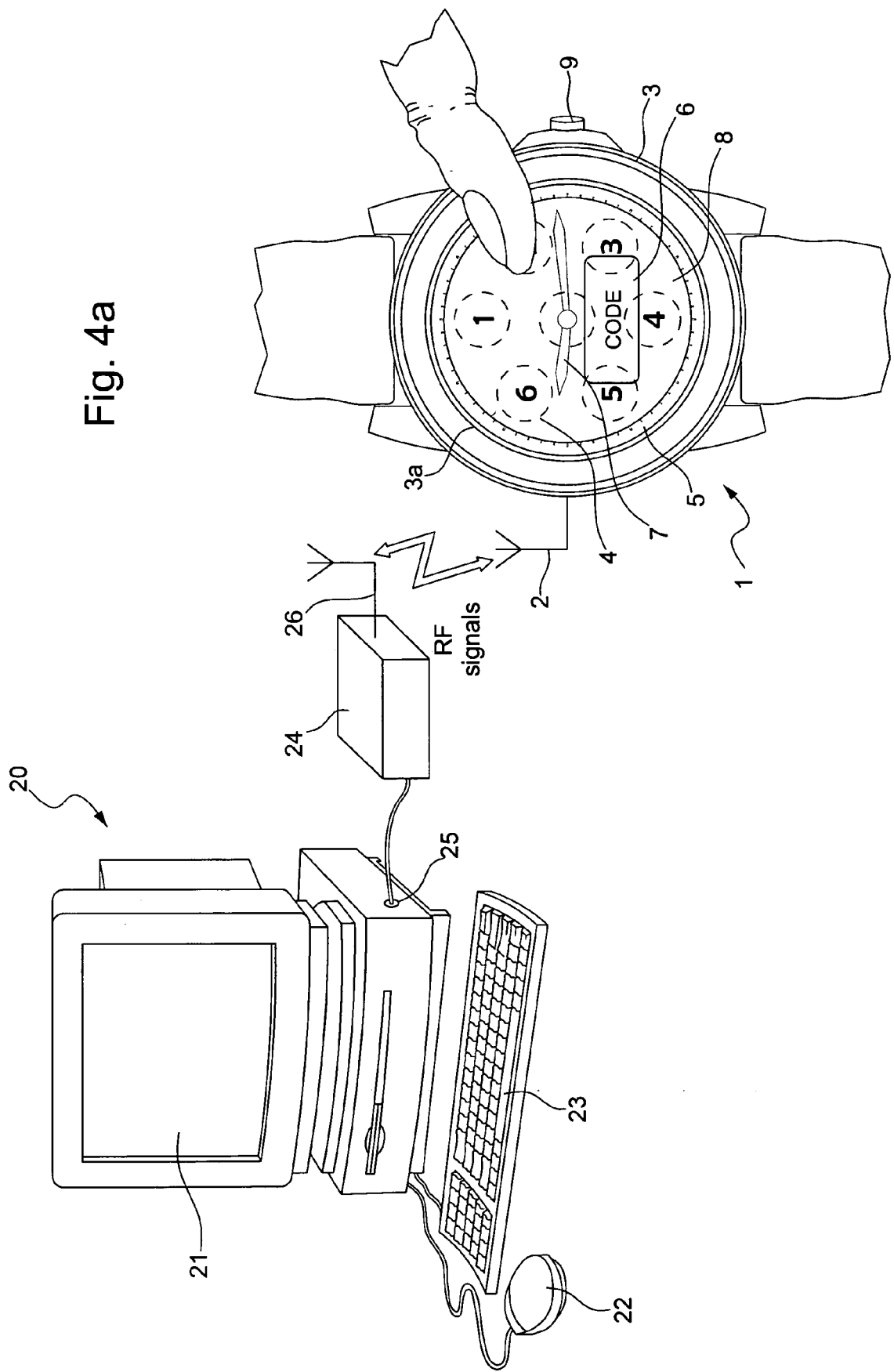
FIG. 4a shows a computer workstation and a wrist watch of FIG. 1a for implementing the method of input of the security code according to the invention.

In FIG. 4a, the wrist watch 1 shown in FIG. 1a is used to implement the method of input of the security code to gain access to a personal computer workstation 20. The computer workstation 20 is essentially made up of a keyboard 23, a mouse 22 and a screen 21. As a general rule, a password must be entered by means of the keyboard 23 for use of the personal computer workstation 20. However, according to the invention the input of this password or security code can be performed by means of the wrist watch 1, as described above with respect to FIG. 1a.

The computer workstation 20 also comprises a peripheral box 24 which is connected by a USB cable 25 or other type of cable to an input port of the computer workstation. This box 24 contains the means for transmitting and/or receiving short-range radio-frequency signals with an antenna 26 for the computer workstation 20. Clearly, in a variant, these transmitting and/or receiving means of the computer workstation can also be integrated into the main part of said workstation. The watch 1 also contains means for transmitting and/or receiving short-range radio-frequency signals with an antenna 2 for unidirectional or bi-directional transmission of information into an action zone of the computer workstation. The two units with their transmitting and/or receiving means therefore enable implementation of the method of input of the security code according to the invention.

As soon as the workstation is activated, it can be provided that an inquiry signal is transmitted to the wrist watch in order to place the watch in a code entry mode. This inquiry signal can control activation of the control keys of the watch to enable entry of the security code. Information of the operations to be undertaken can be displayed on the liquid-crystal display 6 of the watch. The user can be informed of the moment when he/she can commence entry of the security code and if the entered code is correct.

Once the code has been entered in the watch, the microprocessor unit checks the validity of the entered code and controls the transmitting means for transmission of this security code, which can be in encrypted form. The computer workstation receives this security code or password and allows access to these various applications if the security code entered in the watch is correct.

It should be noted that checking of the security code entered on the watch can also be performed in the computer workstation. In this case, the microprocessor unit of the watch only performs processing operations of the entered security code in order to transmit this to the computer workstation.

Figure 4B:
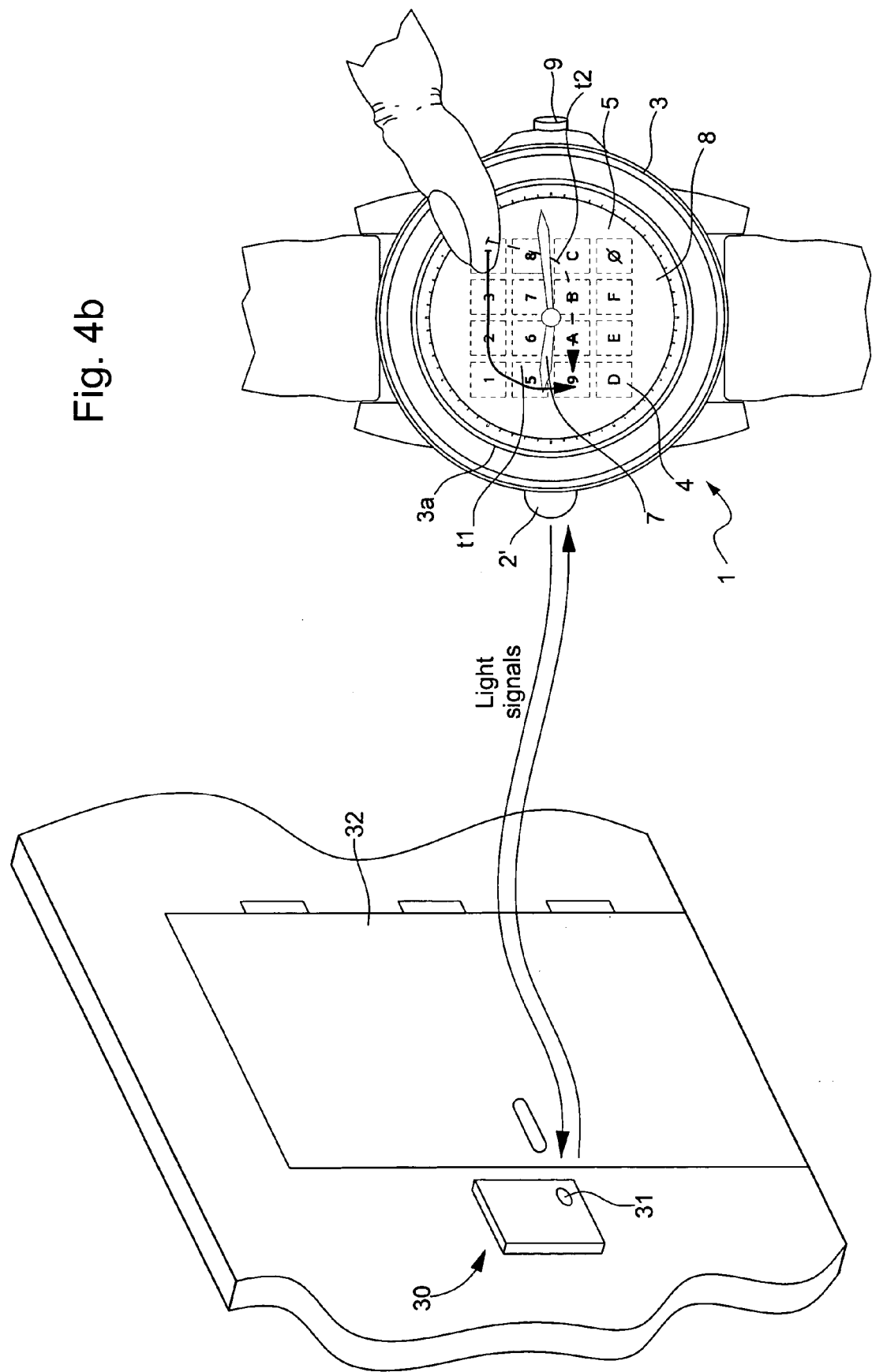
FIG. 4b shows a protected location closed by a door and a second embodiment of a wrist watch for implementing the method of input of the security code according to the invention for access to the location.

In FIG. 4b, a second embodiment of a wrist watch is shown for the implementation of the method of input of the security code to access a protected location via a door 32. At the entrance to the protected location, an instrument 30 for verifying the security code locks the access door 32 when the memorised security code has not been entered. This instrument 30 comprises means 31 for transmitting and/receiving light signals to communicate at close range with the wrist watch, which also has means of transmitting and/or receiving light signals 2'. These means 2' of the watch are generally only activated once the push-button 9 of the watch is pressed and a transmission mode is selected in order to prevent too high an energy consumption. As soon as the button 9 has been pressed, the control keys 4 of the watch glass are operational. A visual or acoustic notification can advise the user of the start of the code to be entered or of the correct entered code.

In this second embodiment, the control keys 4 contain sensitive pads arranged in a matrix on the watch glass. Each control key is formed by a sensitive pad which represents a particular digit or number. However, depending on the programming of the microprocessor unit, each control key can possibly be formed by a group of sensitive pads. In FIG. 4b, the watch glass contains 16 sensitive pads representing 16 control keys 4. Naturally, more control keys, e.g. 25 keys or more, can be provided on the watch glass. If this number of keys is too high, the microprocessor unit must be capable of detecting which configured pad or group of pads has been selected by the finger for entry of the security code.

In FIG. 4b the possibility is provided to enter a security code which only contains two digits or numbers, e.g. the digits 4 and 9. The finger is firstly placed on the first reference of the key representing the digit 4. It can be kept on this sensitive pad of the key for a specific period of time in order to input the digit 4 of the code to be entered. According to another variant, the microprocessor unit can directly register the digit 4 as soon as the finger is placed on the key of the digit 4. From this first reference the finger can be moved over several possible trajectories to reach the second reference of the key representing the digit 9. Only a first trajectory t1 and a second trajectory t2 are indicated by a solid line and a broken line respectively in this figure. The microprocessor unit detects the sensitive keys or pads activated upon movement of the finger on the glass from the first reference to the second reference. It assigns a particular indicator to each trajectory followed for entry of the security code. As a result, it is necessary to remember the trajectory of movement of the finger on the glass from the first reference to the second reference in addition to the trajectory of the digits or numbers of the code.

Working from the above description, a plurality of variants of the method of input of the security code can be conceived by a person skilled in the art without departing from the framework of the invention defined by the claims. The touch screen for implementation of the method according to the invention can form part of an electronic device positioned in an appliance of a given location rather than in a portable object such as a wrist watch, a mobile telephone or a scratch pad-type electronic device. The number of sensitive pads can be higher than 100. In this case, each control key is formed by a group of sensitive pads in accordance with programming of the microprocessor unit. Moreover, several security codes may be provided that are stored, for example, in the electronic device for access to several appliances, several locations or several functions. The security codes can also contain more than three references.

What is claimed is:

1. A method of input of a security code by means of a touch screen of an electronic device for access to a function, apparatus or given location, wherein the touch screen comprises control keys, which can be activated by manual action of a user using a finger or a stylus, each of the keys comprises at least one sensitive pad linked to a microprocessor unit of the electronic device, wherein each key of the touch screen defines a different number, wherein the electronic device is a wrist watch comprising: a liquid-crystal display; means for transmitting and/or receiving signals; and at least one control button to actuate various functions of the watch, wherein the control keys of the touch screen are activated when the control button is pressed, and wherein the liquid-crystal display indicates different operations of entry, verification and transmission of the security code, wherein the method comprises a first series of steps in an entry mode of the security code, the first series of steps comprising:

a) placing a finger or stylus on a first key of the touch screen, wherein the first key represents a first number of the code to be entered; and b) moving the finger or stylus on the touch screen over a specific trajectory from the first key to a second key of the touch screen, wherein the second key represents a second number of the code to be entered, and wherein the microprocessor unit registers sensitive keys or pads activated during the movement of the finger or stylus on the screen from the first key to the second key to determine the security code based on the first number entered, the second number entered and the specific trajectory of the finger or stylus on the keys activated during movement of the finger or stylus.

2. A method according to claim 1, wherein the finger or stylus is removed from the touch screen from a last reference of the code to be entered to validate said code in order to access the function, apparatus or given location.

3. A method according to claim 1, wherein the electronic device further comprises a memory linked to the microprocessor unit for recording at least one security code for access to a function, apparatus or given location, wherein when the electronic device is in a mode for recording or modifying the security code on the memory, the method further comprises a second series of steps corresponding to steps a) and b), and a step comprising removing the finger or stylus from the touch screen from the last reference of the code to be entered to validate said code.

4. A method according to claim 1, wherein the microprocessor unit is linked to a memory, and the security code recorded, or to be recorded, in the memory comprises more than two references represented by digits or numbers, wherein in the entry mode of the security code or in a recording or modifying mode of the security code in the memory, for each reference of the security code to be input between the first reference and last reference, the microprocessor unit detects either a change in trajectory of the movement of the finger or stylus on the screen in the area of the key of the reference to be input or a specific period of time of holding the finger or stylus on the key of the reference to be input, and wherein the security code is validated by removing the finger or stylus from the key of the last reference to be input.

5. A method according to claim 1, wherein the finger or stylus is held on the key of each reference of the security code for a period of time to input each reference in the code to be entered in accordance with programming of the microprocessor unit.

6. A method according to claim 1, wherein the control keys are arranged in the form of a matrix on a watch glass of the wrist watch for entry of the code, and reference marks are placed on the watch glass to indicate a position of the control keys and the corresponding references, wherein the finger or stylus is moved from one reference representing a digit or number to another reference representing a digit or number of the security code to be entered over a specific trajectory, wherein the microprocessor unit registers the control keys activated during the movement of the finger or stylus on the screen to determine the security code.

7. A method according to claim 1, wherein the microprocessor unit verifies the security code at each step of entry or at the end of code entry using a reference security code located in a non-volatile memory of the electronic device.

8. A method according to claim 1,
wherein the control keys are situated around a periphery of a watch glass of the wrist watch for entry of the code, wherein reference marks are placed on the watch glass to indicate a position of the control keys and the corresponding references, wherein the finger or stylus is moved from one reference to another reference of the code to be entered on the watch glass in a clockwise direction or an anti-clockwise direction in accordance with initial programming of the security code performed in the microprocessor unit.

9. A method according to claim 8, wherein the security code comprises more than two references, wherein after input of the first reference and before input of a last reference of the code to be entered, the microprocessor unit detects a change in the direction of rotation of the finger or stylus on the watch glass in an area of a key of a reference of the code to be input.

10. A method according to claim 8, wherein the finger or stylus is moved on the watch glass from one reference to another reference while guided by an upper edge of a bezel of a case of the wrist watch.

11. A method according to claim 8, wherein the wrist watch has hands for indicating time, wherein the hands move to indicate each input reference of the security code in the entry mode of the security code or in a recording or modifying mode of the security code in a memory linked to the microprocessor unit.

12. An electronic device comprising:
a touch screen with control keys, wherein the touch screen is activated by a manual action of a user using a finger or a stylus, and each of the keys comprises at least one sensitive pad connected to a microprocessor unit, wherein each key of the touch screen defines a different number for a security code to be composed, wherein the microprocessor unit is fitted to register sensitive keys or fields activated during movement of the finger or stylus on the screen from one key representing a first reference to second key representing a second reference determining a security code, wherein the electronic device operates to implement a method of input of a security code by means of the touch screen for access to a function, an apparatus or a given location, wherein the electronic device is a wrist watch comprising a liquid-crystal display: means for transmitting and/or receiving signals: and at least one control button to actuate various functions of the watch, wherein the control keys of the touch screen are activated when the control button is pressed, and wherein the liquid-crystal display indicates different operations of entry, verification and transmission of the security code, wherein the method comprises a series of steps in an entry mode, the series of steps comprising:
a) placing a finger or stylus on a first key of the touch screen, wherein the first key represents a first number of the code to be entered; and
b) moving the finger or stylus on the touch screen over a specific trajectory from the first key to a second key of the touch screen, wherein the second key represents a second number of the code to be entered, and wherein the microprocessor unit registers the sensitive keys or pads activated during the movement of the finger or stylus on the screen from the first key to the second key to determine the security code based on the first number entered, the second number entered and the specific trajectory of the finger or stylus on the keys activated during movement of the finger or stylus.

13. An electronic device according to claim 12, wherein the number of keys on the touch screen is 6 or 12, or multiple of 12, in order to associate each reference of the code to be entered with a number or an hour digit displayed on a dial of the wrist watch.

14. A method of input of a security code by means of a touch screen of an electronic device for access to a function, an apparatus or given location, wherein the touch screen comprises control keys, which can be activated by manual action of a user using a finger or a stylus, each of the keys comprises at least one sensitive pad linked to a microprocessor unit of the electronic device, wherein the electronic device is a portable object fitted with means for transmitting and/or receiving signals for wireless communication with a first transceiver of the apparatus or the given location, wherein an inquiry signal is transmitted by the first transceiver to be received by the portable object in a defined zone, and after receipt of the inquiry signal, the security code is entered on the portable object in order to be transmitted to the first transceiver and verified to allow access to the apparatus or the given location, wherein the method comprises a first series of steps in an entry mode of the security code, the first series of steps comprising
- a) placing a finger or stylus on a first key of the touch screen, wherein the first key represents a first reference of the code to be entered; and
- b) moving the finger or stylus on the touch screen over a specific trajectory from the first key to a second key of the touch screen, wherein the second key represents a second reference of the code to be entered, and wherein the microprocessor unit registers sensitive keys or pads activated during the movement of the finger or stylus on the screen to determine the security code.

15. A method according to claim 14, wherein the control keys of the touch screen are activated as soon as the inquiry signal is received.

16. A method of input of a security code by means of a touch screen of an electronic device for access to a function, an apparatus or given location, wherein the touch screen comprises control keys, which can be activated by manual action of a user using a finger or a stylus, each of the keys comprises at least one sensitive pad linked to a microprocessor unit of the electronic device, wherein the method comprises a first series of steps in an entry mode of the security code, the first series of steps comprising:
- a) placing a finger or stylus on a first key of the touch screen, wherein the first key represents a first reference of the code to be entered; and
- b) moving the finger or stylus on the touch screen over a specific trajectory from the first key to a second key of the touch screen, wherein the second key represents a second reference of the code to be entered, and wherein the microprocessor unit registers sensitive keys or pads activated during the movement of the finger or stylus on the screen to determine the security code, wherein the electronic device is an analog wrist watch, wherein the number of keys on the touch screen is 12, or a multiple of 12, in order to associate each reference of the code to be entered with an hour digit displayed on a dial of the wrist watch.

* * * * *